United States Patent
Xu et al.

(10) Patent No.: US 10,140,698 B2
(45) Date of Patent: Nov. 27, 2018

(54) POLYGON-BASED GEOMETRY CLASSIFICATION FOR SEMICONDUCTOR MASK INSPECTION

(71) Applicant: KLA-Tencor Corporation, Milpitas, CA (US)

(72) Inventors: Yin Xu, Shanghai (CN); Wenfei Gu, Shanghai (CN); Rui-fang Shi, Cupertino, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/230,836

(22) Filed: Aug. 8, 2016

(65) Prior Publication Data
US 2017/0046471 A1    Feb. 16, 2017

Related U.S. Application Data

(60) Provisional application No. 62/203,281, filed on Aug. 10, 2015.

(51) Int. Cl.
*G06T 7/00* (2017.01)

(52) U.S. Cl.
CPC .. *G06T 7/0006* (2013.01); *G06T 2207/30148* (2013.01)

(58) Field of Classification Search
USPC .......................................................... 716/51
See application file for complete search history.

(56) References Cited

U.S. PATENT DOCUMENTS

| | | | |
|---|---|---|---|
| 7,167,185 B1 | 1/2007 | Yiin et al. | |
| 8,855,400 B2 | 10/2014 | Wang et al. | |
| 2002/0007481 A1* | 1/2002 | Ono | G03F 7/70441 716/52 |
| 2006/0277520 A1* | 12/2006 | Gennari | G03F 7/706 716/53 |
| 2009/0193382 A1* | 7/2009 | Melzner | G06F 17/5072 716/129 |
| 2010/0226562 A1 | 9/2010 | Wu et al. | |
| 2013/0163851 A1 | 6/2013 | Dalla-torre et al. | |

(Continued)

FOREIGN PATENT DOCUMENTS

WO    2013134605 A1    9/2013

OTHER PUBLICATIONS

"International Application Serial No. PCT/US2016/046282, Search Report dated Dec. 8, 2016", 3 pgs.

*Primary Examiner* — Eric Lee
(74) *Attorney, Agent, or Firm* — Kwan & Olynick LLP

(57) ABSTRACT

Disclosed are methods and apparatus for providing feature classification for inspection of a photolithographic mask. A design database for fabrication of a mask includes polygons that are each defined by a set of vertices. Any of the polygons that abut each other are grouped together. Any grouped polygons are healed so as to eliminate interior edges of each set of grouped polygons to obtain a polygon corresponding to a covering region of such set of grouped polygons. Geometric constraints that specify requirements for detecting a plurality of feature classes are provided and used for detecting a plurality of feature classes in the polygons of the design database. The detected features classes are used to detect defects in the mask.

20 Claims, 9 Drawing Sheets

(56) References Cited

U.S. PATENT DOCUMENTS

2013/0322736 A1\* 12/2013 Yu .......................... G06T 7/001
                                                            382/149
2014/0050389 A1    2/2014 Mahadevan et al.
2014/0341462 A1   11/2014 Sezginer et al.

\* cited by examiner

POLYGON-BASED GEOMETRY CLASSIFICATION FOR SEMICONDUCTOR MASK INSPECTION

CROSS-REFERENCE TO RELATED APPLICATIONS

This application claims the benefit of the following prior applications: (i) U.S. Provisional Application No. 62/203,281, filed 10 Aug. 2015, titled "POLYGON-BASED GEOMETRY CLASSIFICATION FOR SEMICONDUCTOR MASK INSPECTION" by Yin Xu et al., which application is herein incorporated by reference in its entirety for all purposes.

TECHNICAL FIELD OF THE INVENTION

The invention generally relates to a field of reticle inspection. More particularly the present invention relates to geometry classification of features for defect detection during an inspection.

BACKGROUND

The industry of semiconductor manufacturing involves highly complex techniques for integrating circuits into semiconductor materials. One of the techniques includes photolithography, which involves using a combination of etching and deposition processes to transfer patterns from a photomask or reticle to a layer of photoresist. The patterned photoresist layers are used to selectively etch semiconductor substrates that form the IC devices. A typical photomask, or light-blocking mask, is made of a quartz (glass) substrate that supports a patterned layer of opaque material, such as chrome. For instance, one type of light blocking mask is a phase shift mask, or PSM. Other types of masks include advanced phase shift masks, such as embedded attenuating phase shift masks (EAPSM) and alternating phase shift masks (APSM).

Due to the large scale of circuit integration and the decreasing size of semiconductor devices, the semiconductor manufacturing process is prone to defects. Inspection and test procedures are therefore critical for quality control purposes. Specific inspection and testing procedures have been developed as part of photomask and reticle manufacturing processes. Most techniques for inspecting a photomask involve obtaining high quality grayscale images. These images are then analyzed to detect possible defects. In the process of separating critical defects from non-critical (nuisance) defects, geometry classification is often necessary. Standard techniques typically use grayscale images for geometry classification. For example, a corner defect is less critical than a defect with the same defect strength on an edge. The former may not have any printing impact on the wafer, while the later can have significant printing impact. However, due to the finite resolution (or pixel size), geometry classification based on optical images does not always have enough fidelity, making defect classification inaccurate.

In a die-to-database inspection, the design database, which was used to produce the photomask, can be converted into rasterized database images that are then further processed to simulate the inspection imaging process. These rendered images are then compared to the reticle images to find potential defects. However, even though these rasterized images have higher resolution than the optical images, there are still issues with classification of defects using such rasterized database images due to their finite resolution.

As such, there is a strong need to improve current photomask inspection defect and geometry classification.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified and abstract form as a prelude to the more detailed description that is presented later.

In one embodiment, a method for providing feature classification for inspection of a photolithographic mask is disclosed. A design database for fabrication of a mask is provided, and the design database includes polygons that are each defined by a set of vertices. Any of the polygons that abut each other are grouped together, and any grouped polygons are healed together so as to eliminate interior edges of each set of grouped polygons to obtain a polygon corresponding to a covering region of such set of grouped polygons. Geometric constraints that specify requirements for detecting a plurality of feature classes are also provided. After the healing is performed on the design database, feature classes in the polygons of the design database are detected based on the geometric constraints. In an inspection of a mask fabricated with the design database, defects are detected based on the detected feature classes in the design database.

In a specific implementation, the geometric constraints include angle constraints, edge length restraints, and an interior area constraint for detecting a nub feature. In a further aspect, the edge length constraints specify a maximum width for the nub feature, a maximum height for the nub feature, and a minimum base length from which the nub feature extends. In another embodiment, the geometric constraints include angle constraints, edge length restraints, and an exterior area constraint for detecting a notch feature, and wherein the edge length constraints specify a maximum width for the notch feature, a maximum height for the notch feature, and a minimum base length from which the notch feature extends. In another aspect, the geometric constraints include constraints for detecting a thin line feature as having a critical dimension that is less than a predefined threshold.

In another embodiment, the feature classes are selectively detected for areas around candidate defects detected during the inspection. In a further aspect, the grouping and healing are selectively performed for areas around candidate defects detected during the inspection. In another implementation, detecting feature classes is not resolution-limited. In another aspect, new geometric constraints, which are configured by a user to be added to the geometric constraints, are received. In another embodiment, detecting defects is based on a plurality of thresholds corresponding to the feature classes detected in the design database.

In an alternative embodiment, the invention pertains to an inspection system for providing feature classification for inspection of a photolithographic mask. The system includes at least one memory and at least one processor that are configured to perform one or more of the above-described methods.

These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

One conventional die-to-database inspection approach includes first rasterizing a database (DB) image with grayscale values from the database polygons, e.g., as designed and described in GDSII format, as described further in U.S. Pat. No. 7,167,185, which is incorporated herein by reference in its entirety. Various strategies (erosion, template matching, sweep line, etc.) may then be applied around defective regions on a potential defect image to identify different geometry classifications according to specific inspection or desensing requirements for defect detection. For example, nuisance and real defects can be distinguished.

As the dimensions of features to be printed on the wafer continue to shrink, the size of DB mask design continues to get smaller. Due to the resolution limitation of rasterized DB image, the geometry classification around defects is becoming unstable and unreliable on regions with small DB patterns. The resolution limitation of rasterized images can be reduced by rasterizing DB figures on smaller grids. However, both the memory and computing time increase exponentially with smaller grids, and this particular approach is evolving into a scheme that is no longer cost effective.

Figure 1:
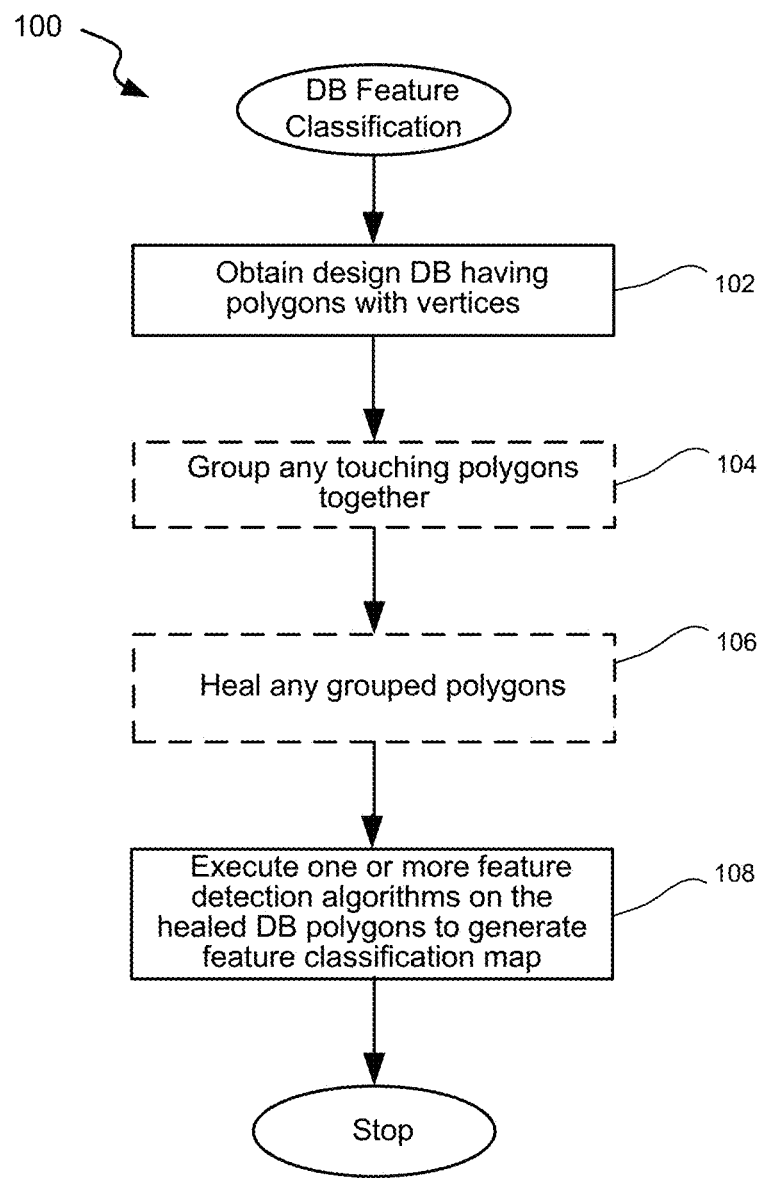
FIG. 1 is a flow chart illustrating a database (DB) feature classification process in accordance with one embodiment of the present invention.
Figure 2A:
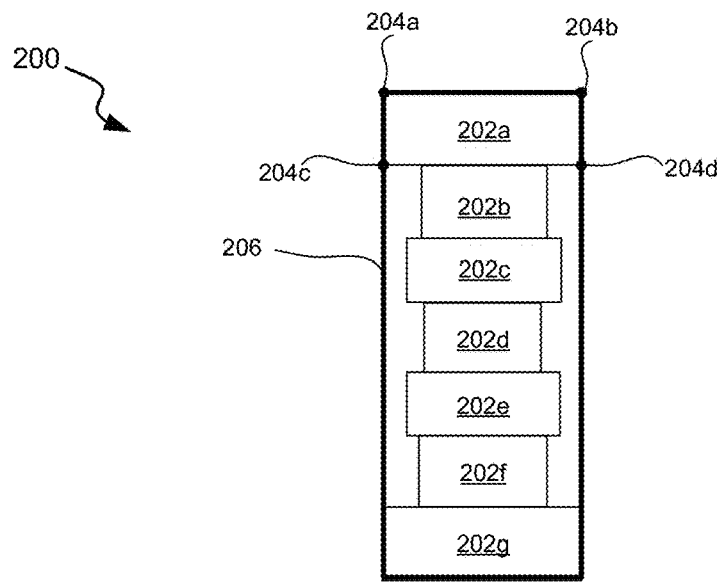
FIG. 2A is a top view of a portion of the design DB that includes a plurality of polygons having vertices.

In general, certain embodiments of the invention use processed DB polygons for feature classification for use in defect detection. FIG. 1 is a flow chart illustrating a database (DB) feature classification process 100 in accordance with one embodiment of the present invention. Initially, a design database having a plurality of polygons with vertices is obtained in operation 102. The input data to a particular DB inspection approach may include patterns designed by Electronic Design Automation (EDA) software. Those design patterns are geometrically represented as polygons, either trapezoids or rectangles on a two-dimensional plane, each having of three or four vertices. In general, a design DB may include complex shapes that are formed from more fundamental shapes, such as rectangles or squares. As shown in FIG. 2A, a portion of the database 200 includes a plurality of simple polygons, e.g., rectangular polygon 202a-202g. By way of example, polygon 202a includes vertices 204a, 204a, 204c, and 204d.

The vertices may be stored as x and y coordinates on a 2D plane, together defining a continuous form of geometric shapes of design patterns. Since the vertices of each polygon of the design are defined and known with infinite resolution (at least theoretically), the polygons exported from a mask DB actually can be regarded as a resolution-independent pattern. A fracturing process, such as CATS available from Synopsys of Mountain View, Calif., may have been executed with respect to the design DB so that complex shapes are broken up into simpler polygons.

After exporting or obtaining polygons from a mask DB, for example, any the touching polygons may be grouped together in operation 104. As shown in FIG. 2A, group 206 may be formed. Any grouped polygons may then be healed in operation 106. Healing is performed so as to eliminate all interior edges for each set of grouped polygons to obtain a polygon corresponding to a covering region for such set of grouped polygons. Effectively, all the touching polygons are "stitched" together to obtain a complex polygon representing the contour shape of the grouped polygons. Operations 104 and 106 may be skipped if the design DB has not undergone a fracturing process.

Figure 2B:
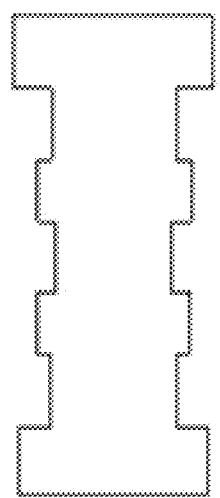
FIG. 2B is a top view of the results of a polygon healing process performed with respect to the polygons of the database portion of FIG. 2A in accordance with one embodiment of the present invention.
Figure 2C:
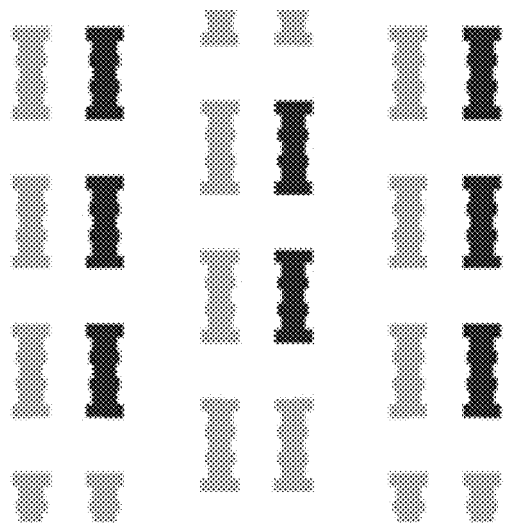
FIG. 2C is a top view of the results from a polygon healing applied to a larger area of the design database in accordance with a specific application of the present invention.

FIG. 2B is a top view of the results of a polygon healing process performed with respect to the polygons of the database portion of FIG. 2A in accordance with one embodiment of the present invention. In effect, the internal edges of the touching polygons from FIG. 2A are removed within the grouping boundary to result in the shape of FIG. 2B. FIG. 2C is a top view of the results from a polygon healing applied to a larger area of the design database in accordance with a specific application of the present invention. In 2D computational geometry theory, polygon healing is similar to the Union operation in the category of polygon Boolean operations.

Once the polygons of the mask DB are healed, various feature detection algorithms can be executed on the healed DB polygons to generate a feature classification map in operation 108. The resulting healed polygons may be represented by an ordered list of vertices, by way of example. The resulting list of vertices may be used as input to one or more feature detection algorithms. In general, the feature detection algorithms may iteratively check whether one or more specific geometric constraints for particular feature classes are satisfied on each vertex location (or set of vertices).

Any suitable type and number of feature detection algorithms may be implemented on the resulting vertices of the polygon results from the healing process. Examples of feature detection processes include template matching, sweep line, shrink/expand, etc.

Template matching generally involves using a set of templates of particular feature type to locate features that match such templates. For instance, a template for a cross shaped feature may be used to locate cross type features in the healed design DB. Each feature template may include one or more constraints for identifying a particular polygon as a particular feature type.

One important application that is related to mask inspection is Notch/Nub (N/N) detection, which defines N/N feature as concave or convex, respectively, Optical Proximity Correction (OPC) regions of clear (bright) materials satisfying user-specified dimensional constraints on the DB image. A polygon-based N/N detector operates directly on the healed DB polygons by applying N/N-specific geometric constraints, which are specified by converting the dimensional constraints of N/N features. Specifically, the N/N detector iterates through the vertices of each polygon to check whether all the geometric constraints of a N/N feature are satisfied. This approach provides a continuous-form expression of a N/N feature, thus, achieving a resolution-independent result during N/N detection. That is, polygons or polygon portions are defined by a plurality of vertices coordinates that together define a continuous shape with a well-defined structure.

Figure 3A:
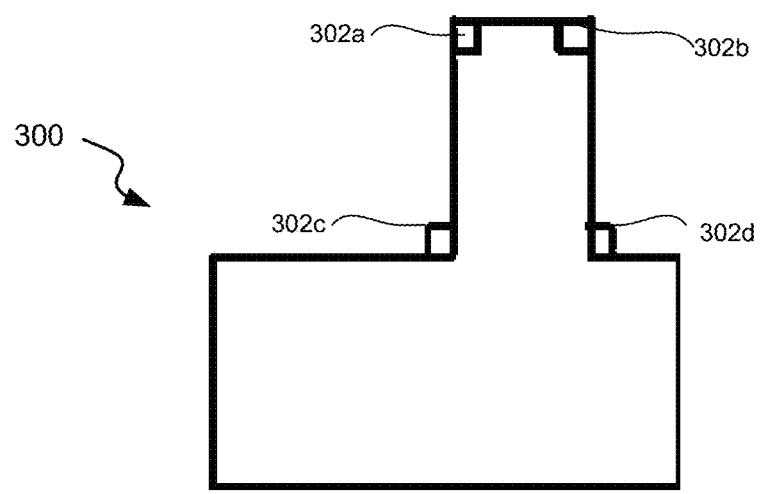
FIGS. 3A-3C illustrate a set of constraints for identifying a "nub" type DB feature in accordance with one embodiment of the present invention.
Figure 3B:
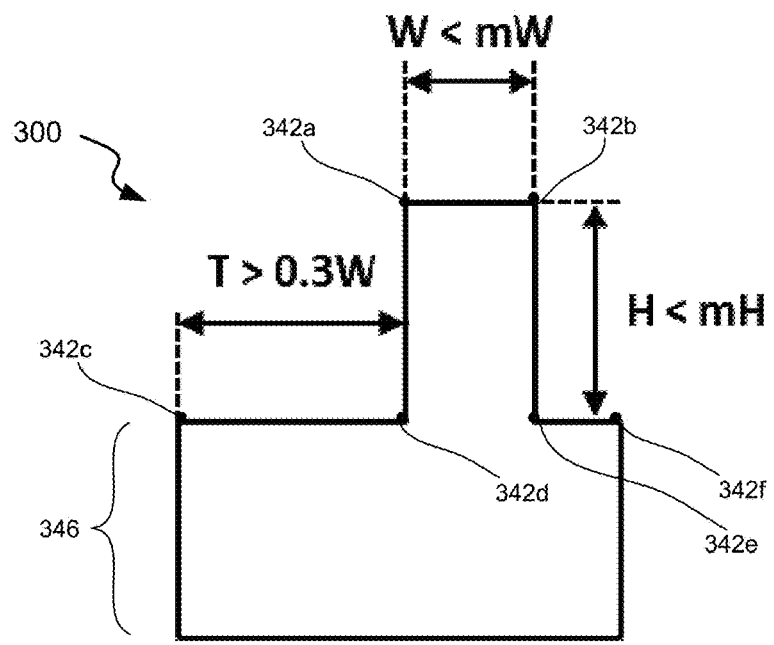
Figure 3C:
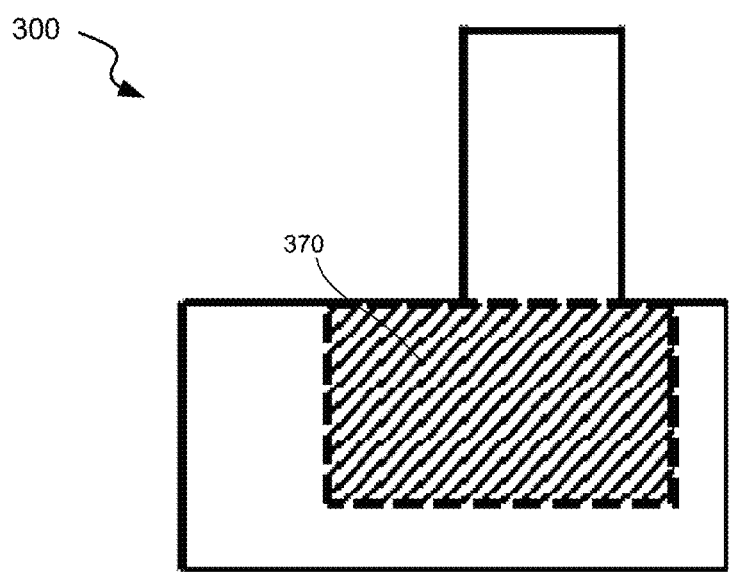

FIGS. 3A-3C illustrate implementation of a set of geometric constraints for identifying a "nub" type DB feature of a polygon 300 in accordance with one embodiment of the present invention. Specifically, the angle of two edge vectors of a potential nub region are required to satisfy specific qualifications, such as orthogonality. An edge may generally be defined as a line between two vertices of a polygon. As shown in FIG. 3A, example orthogonality angle constraints 302a, 302b, 302c, and 302d for a potential nub polygon 300 are illustrated.

Another constraint for identifying a nub feature may include length constraints for one or more edges of a potential nub region. Generally, the length of certain edges of a candidate nub feature can be required to be within a specified range or proportional to some other edges of such potential nub region. FIG. 3B illustrates length constraints for identifying a nub in a design DB polygon 300 in accordance with one embodiment of the present invention. As shown, a potential nub portion of the polygon 300 (between vertices 342a and 342b) is required to have a width W that is less than a predefined width mW. This potential nub portion also is required to have two edges (between vertices 342a and 342d and between vertices 342b and 342e) that have a height H that is less than a predefined height mH. The nub portion is also required to extend from a base portion that has an edge that is at least greater than 0.3 of the potential nub's width W.

Constraints for identifying nub features may also include an interior constraint. This constraint requires that the DB polygon interior area for a potential nub feature can fully contain another polygon shape with specific dimensions, as shown in FIG. 3C. This property can be examined by checking all the edges of a specific interior constraint polygon with respect to the interior of the DB polygon having the potential nub feature. As shown, an interior constraint takes the form of area 370 that is to be fully contained by polygon 300.

Figure 4A:
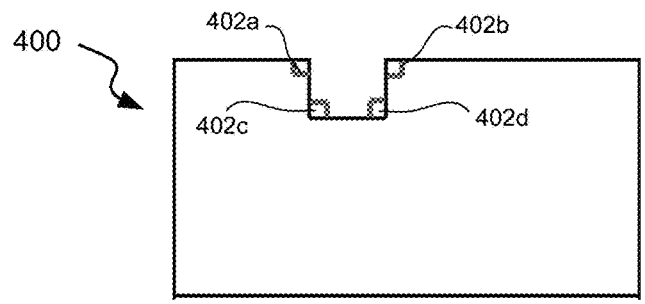
FIGS. 4A-4C illustrate implementation of a set of geometric constraints for identifying a "notch" type DB feature in accordance with one embodiment of the present invention.
Figure 4B:
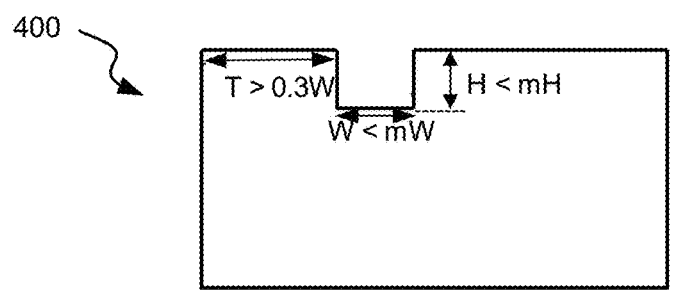
Figure 4C:
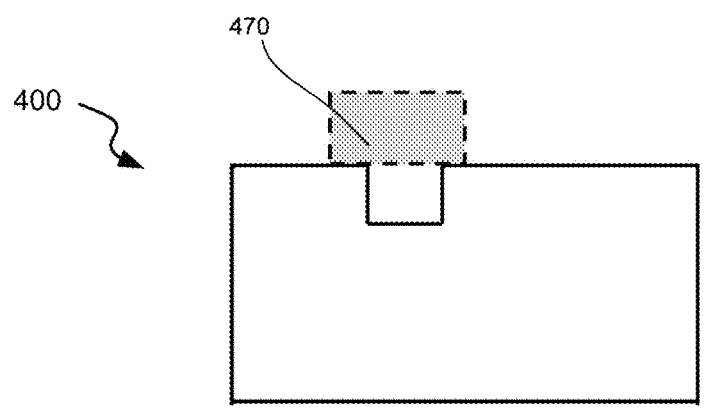

On the other hand, a notch detector will include a different set of geometric constraints to be applied to potential notch features of the DB image. FIGS. 4A-4C illustrate implementation of a set of geometric constraints for identifying a "notch" type DB feature of a DB polygon 400 in accordance with one embodiment of the present invention. FIG. 4A illustrates angle constraints, such as orthogonality, for a notch feature. FIG. 4B illustrates example length constraints for a notch feature. Finally, FIG. 4C illustrates an exterior constraint that requires an exterior area 470 to be fully outside the potential notch region. Said in another way, the exterior area 470 is not contained within the notch region.

Figure 5A:
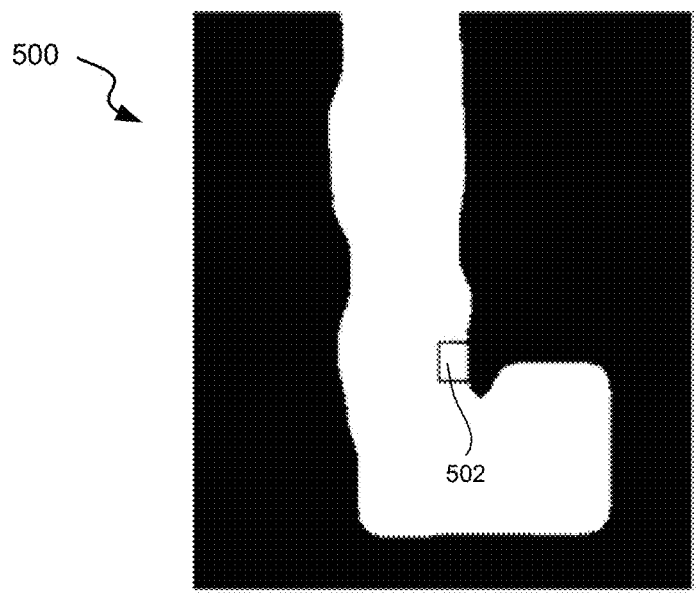
FIGS. 5A and 5B illustrate a comparison between an DB-image-based notch detector and polygon-based notch detector in accordance with one application of the present invention.
Figure 5B:
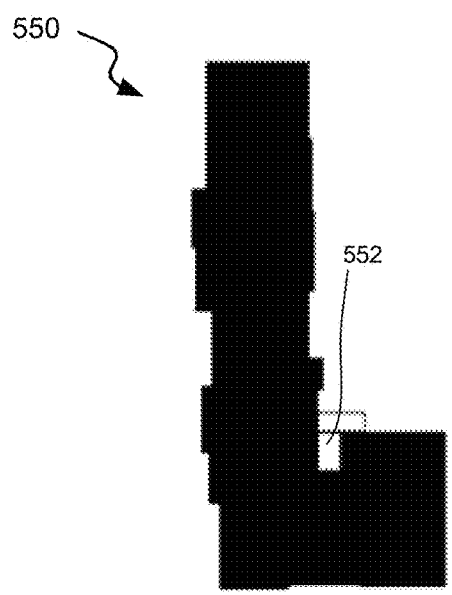

Certain embodiments of the present invention allow certain features to be more reliably identified in the defined DB polygons, as compared to die or DB images. FIGS. 5A and 5B illustrate a comparison between a DB-image-based notch detector and DB-polygon-based notch detector in accordance with one application of the present invention. The image-based notch detector runs on a rasterized mask DB image, as shown in FIG. 5A. The notch detector fails to catch the "shallow valley" notch feature that is near defect pixel 502 due to the blurred image pixels near this defect location. In contrast, a polygon-based notch detector rims on resolution-independent DB polygons, and successfully catches tiny notch 552 of polygon 550 as shown in FIG. 5B.

Figure 6B:
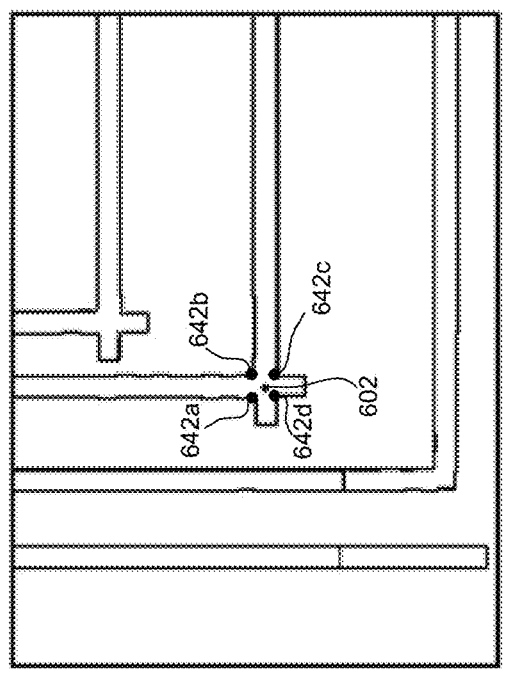
FIG. 6B illustrates identification of corner vertices of a junction in a polygon pattern using a polygon-based approach in accordance with one embodiment of the present invention.
Figure 6A:
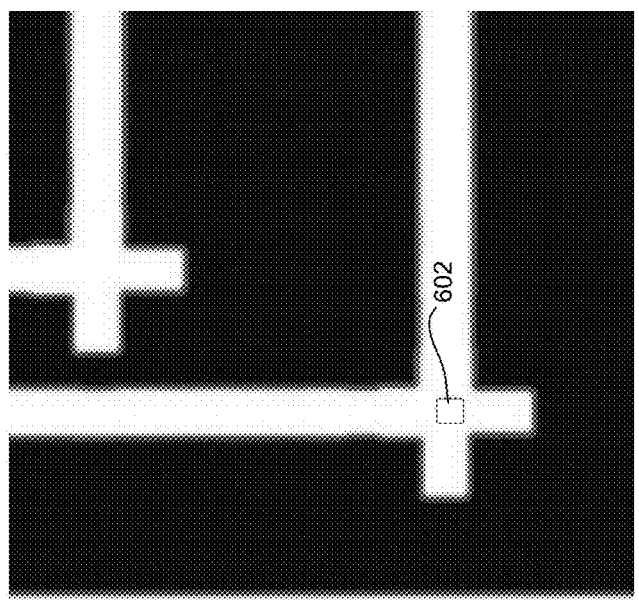
FIG. 6A illustrates conventional image-based detectors that fail to identify a junction shape in a DB image.

In traditional EUV inspection, the resolution limitation also exists with a rasterized DB image. Conventional image-based detectors fail to identify the "junction" shapes of design patterns as shown in FIG. 6A, which appear as the intersection of horizontal and vertical bars subject to given critical dimension (CD) range (typically smaller than 3 pixels). If a defect (602) is near this unidentified junction, such defect 602 may be subject to too low a sensitivity for defects that are near junctions, which are more sensitive to defects. In contrast, a polygon-based detector successfully captures the corner vertices of DB polygons, satisfying geometric constraints for angles and length as mentioned above. FIG. 6B illustrates identification of corner vertices 642a, 642b, 642c, and 642d of a junction in a polygon pattern using a polygon approach in accordance with one embodiment of the present invention.

Another feature detector pertains to OPC data that is in the form of a thin line detector (Thin Line or TL detector). A TL detector classifies design patterns with CD (critical dimension) that is smaller than a given threshold. While an image-based TL detector into which rasterized DB image patterns are input might be limited by image resolution on tiny features, a polygon-based TL detector may be configured to check geometric constraints for a continuous form that is intrinsic to original DB design data, and, thus, can overcome such limitations.

Geometry classification may be selectively performed only around defect locations. For instance, the polygon healing and feature detection process may be performed for a certain area range around each defect, whose position could be converted from corresponding defect pixel coordinate on DB image. Thus, the throughput of certain embodiments could be very high since only a very small percentage of polygons need to be processed.

Certain embodiments of the present invention provide a mechanism for reliably classifying features using DB polygons, and the different classified features can be associated with different inspection algorithms. For instance, potential defects that are near or on certain types of edge features may require a higher sensitivity for defect detection than corner features. Since features are reliably classified, the inspection can avoid using too low a sensitivity for important features and also avoid using too high a sensitivity for non-critical features that are "don't care" areas for having defects. For instance, candidate defects that are near a corner may be inspected at a low threshold for defining as real defects so that the inspection results will not contain a lot of nuisance corner defects, which can be significantly high (e.g., 1000's).

In some applications, certain embodiments can achieve a high-accuracy geometry classification of defects for die-to-database as well as die-to-die) mask inspection that is not limited by resolution limits of rasterized DB images. Additionally, the techniques described herein can provide an easy mechanism for defining new feature shapes for the DB design data by simply introducing new geometric constraints in terms of DB polygons. For example, users can easily design or configure the dimensional constraints of new geometric feature types.

Incorrect geometry classification during inspection can have a catastrophic impact on yield when critical defects are missed because candidate defects get misclassified into wrong categories, leading to lost time and money for wafer manufacturers, and in extreme cases, complete loss of profitability. Most geometry classification today is based on rasterized images. Certain simplified DB polygon-based geometry classification embodiments described above allow customers to define feature shapes more rigorously, to detect different features even with tiny dimensions, to overcome the resolution limitation of rasterized DB patterns images, and overall to improve the robustness of geometry classification.

Figure 7:
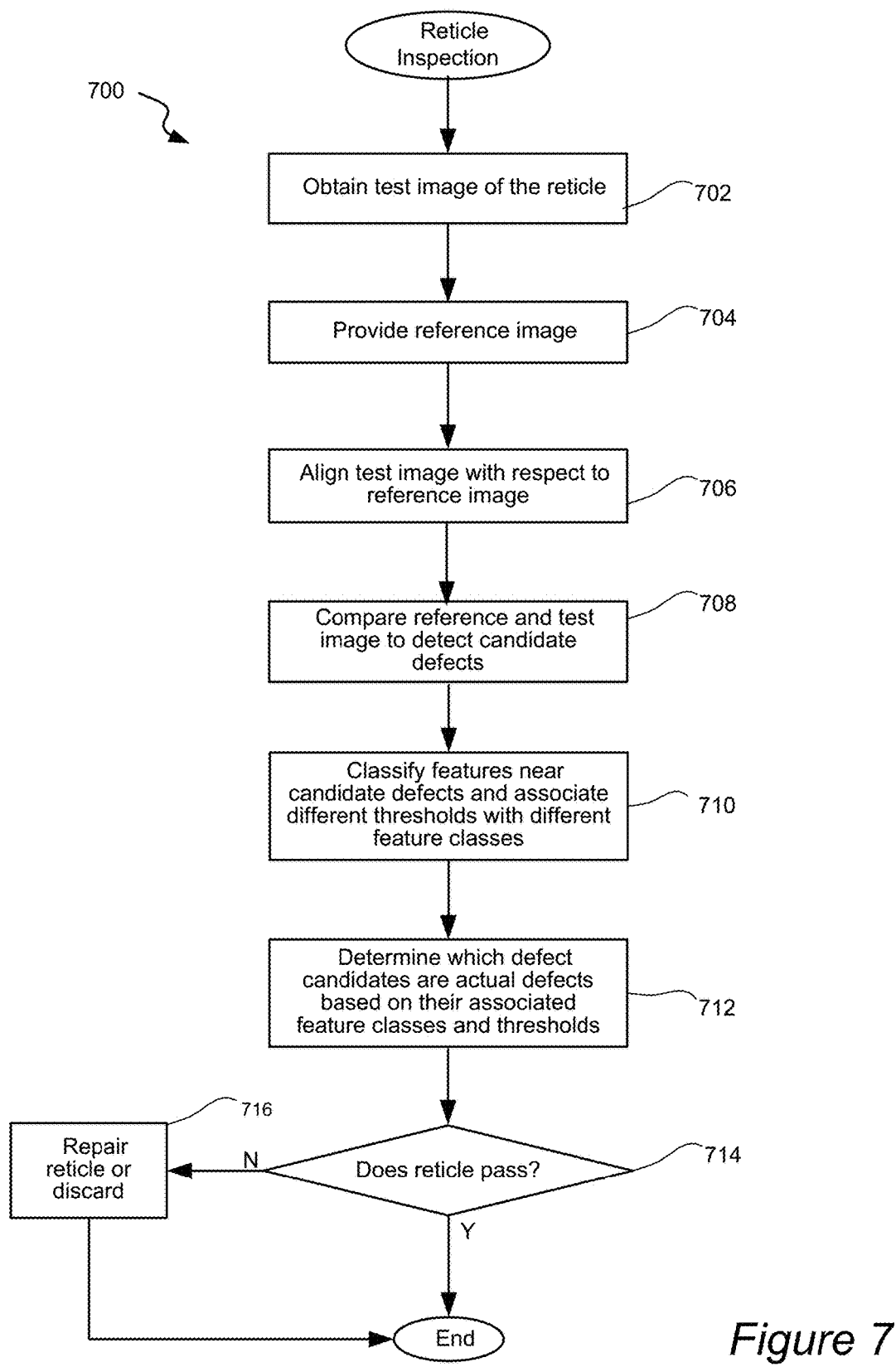
FIG. 7 is a flowchart illustrating a reticle inspection procedure in accordance with one embodiment of the present invention.

FIG. 7 is a flowchart illustrating a reticle inspection procedure 700 in accordance with one use of the present invention. Although this process is described as being applied to a pair of test and reference images, the process is typically applied to a high number of images. For instance, a reticle may be imaged to produce a plurality of separately analyzed images.

Initially, a test image from the reticle may be obtained in operation 702. For instance, an inspection system is used to obtain a plurality of images of a reticle. A reference image may also be provided in operation 704. For example, another image of an equivalent die area on the reticle is obtained for a die-to-die type inspection. In a die-to-database inspection, a reference image is generated based on the design database. For example, the inspection optics are modeled and applied to the design patterns to obtain a reference image. The test image may be aligned with respect to the reference image in operation 706. Both the test and reference images may be mask recovered spot images as described herein or "raw" images obtained from the inspection tool.

In operation 708, the reference image is compared to test image to detect candidate defects (difference features). In a specific embodiment, differences are identified between aligned test transmitted and reference transmitted images and between aligned test reflected and the reference reflected images.

Features near candidate defects may then be classified and different thresholds associated with different feature classes in operation 710. The classification process of FIG. 1, for example, may be executed to generate a feature classification map for only areas around detected candidate defects. The feature classification map identifies particular feature classes that are located adjacent or overlapping with detected candidate defects.

Photomask inspection methods may involve providing one or more user-defined detection thresholds for particular feature types. For example, adjacent line features may be assigned one detection threshold, while corner features may be assigned a lower threshold. This differentiation can be used to optimize inspection resources by reducing detection of nuisance defects and increasing defect capture.

It may then be determined which of the candidate defects are actual defects based on their associated feature classes and associated thresholds in operation 712. For instance, if a detected potential detect is near a corner, it may be analyzed with a lower threshold for defining it as a defect. The potential defects may be associated with different classified features and corresponding thresholds. Alternatively, if a potential defect is not near a classified feature, a default threshold may be used.

It may then be determined based on the comparison results whether the reticle passes inspection in operation 714. If the reticle passes, the inspection process may end, and fabrication may proceed, using the passing reticle. If the reticle does not pass, the reticle can either be repaired or discarded in operation 716 and inspection ends.

In certain embodiments, inspection is applied to multiple tone masks as well. One example of such masks are tri-tone masks having a darkest region (e.g., a chrome or opaque regions) and a quartz or lightest region with a pattern of grey scale regions having a darkness between the two. Such grey scale regions can be obtained in a number of ways (e.g., using EPSM materials and so on). In this case, the mask is treated as two different masks that are separately analyzed. For example, a tri-tone mask can be treated using the same techniques as described above. However, the tri-tone mask can be treated as a mask having a background pattern e.g., chromium) with the grey scale pattern e.g., EPSM material) treated as the foreground. The images can be processed as above using the same process operations. A second analysis is performed on the mask using the EPSM material as the background pattern and the lightest pattern (e.g., the quartz) treated as the foreground. Alignment can easily be effectuated because each of the materials have substantially differing properties that demonstrate different edge effects which can be used to align the images. The mask patterns can then be summed and then compared to references in die-to-die or die-to-database comparisons to verify wafer pattern correctness throughout the process window and to identify lithographically significant defects.

System Examples

Figure 8:
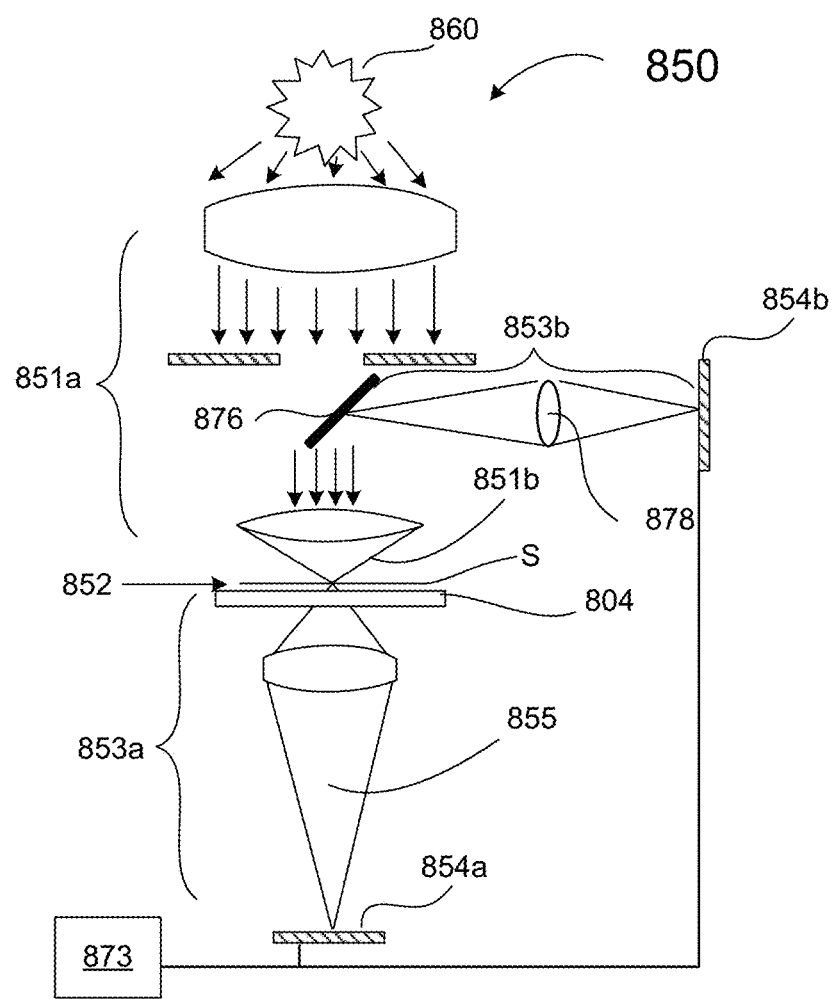
FIG. 8 provides a schematic representation of a photomask inspection apparatus in accordance with certain embodiments.

The techniques described herein may be used during an inspection process that is implemented on or with respect to images and data obtained from various specially configured inspection systems, such as the one schematically illustrated in FIG. 8. The illustrated system 850 includes an illumination source 860 producing at least one light beam that is directed through illumination optics 851a onto a sample S, such as a photomask or wafer, in plane 852. The inspection system 850 may have a numerical aperture 851b at plane 852. The illumination optics 851a may also include various lens and modules for achieving one or more incident beams with different characteristics. The sample S to be inspected/measured is placed on a stage mechanism 804 at the plane 852 and exposed to the source.

The transmitted image from a sample S (e.g., a mask) can be directed through a collection of optical elements 853a, which project the patterned image onto a sensor 854a.

Optical elements (e.g., beam splitter 876 and detection lens 878) are arranged to direct and capture the reflected and/or scattered light from the sample S onto sensor 854b. Suitable sensors include charged coupled devices (CCD), CCD arrays, time delay integration (TDI) sensors, TDI sensor arrays, photomultiplier tubes (PMT), and other sensors. Certain inspection tools may include only the reflecting collection optics 853b (or other scattering optics) and sensor 854b, excluding optics 853a and sensor 854a.

The illumination optics column may be moved respect to the mask stage and/or the stage moved relative to a detector or camera by any suitable mechanism so as to scan patches of the reticle. For example, a motor mechanism may be utilized to move the stage. The motor mechanism may be formed from a screw drive and stepper motor, linear drive with feedback position, or band actuator and stepper motor, by way of examples.

The signals captured by each sensor (e.g., 854a and/or 854b) can be processed by a controller system 873, such as by one or more signal processing devices, which may each include an analog-to-digital converter configured to convert analog signals from each sensor into digital signals for processing. The controller system 873 may include one or more processors coupled to input/output ports, and one or more memories via appropriate buses or other communication mechanisms.

The controller system 873 may also include one or more input devices e.g., a keyboard, mouse, joystick) for providing user input, such as changing or configuring feature detectors, changing thresholds or other inspection recipe parameters, etc. The controller system 873 may also be connected to the stage positioning mechanism for controlling, for example, a sample position (e.g., focusing and scanning) and connected to other in system components for controlling other inspection parameters and configurations of such components.

The controller system 873 may be configured (e.g., with programming instructions) to provide a user interface (e.g., a computer screen) for displaying resultant intensity values, images, and other inspection/metrology results. The controller system 873 may be configured (e.g., with programming instructions) to provide a user interface (e.g., on a computer screen) for displaying resultant intensity values, images, defects, and other inspection/metrology characteristics. In certain embodiments, the controller system 873 is configured to carry out inspection techniques detailed above.

Because such information and program instructions may be implemented on a specially configured computer system, such a system includes program instructions/computer code for performing various operations described herein that can be stored on a non-transitory computer readable media. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

In certain embodiments, a system for inspecting a semiconductor sample includes at least one memory and at least one processor that are configured to perform techniques described herein. Examples of an inspection system include specially configured 29xx, 8xxx, or 3xxx inspection system families available from KLA-Tencor of Milpitas, Calif.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. For instance, the above described feature classifications may be applied to inspection of any suitable sample, such as a semiconductor wafer. Accordingly, the present embodiments are to be considered as illustrative and not restrictive, and the invention is not to be limited to the details given herein.

What is claimed is:

1. A method for providing feature classification for inspection of a photolithographic mask, the method comprising:
   providing a design database for fabrication of a mask, wherein the design database has a plurality of polygons, wherein a set of vertices define each polygon;
   grouping any of the polygons that abut each other;
   healing any grouped polygons together so as to eliminate interior edges of each set of grouped polygons to obtain a polygon corresponding to a covering region of such set of grouped polygons;
   providing geometric constraints that specify requirements for detecting a plurality of feature classes, including a plurality of geometry classes, for different inspection requirements for defect detection on a mask fabricated with the design database;
   after the healing is performed on the design database, detecting a plurality of feature classes in the polygons of the design database based on the geometric constraints, wherein different feature classes are detected for different polygons meeting different geometric constraints; and
   in an inspection of a mask fabricated with the design database, detecting defects based on the detected feature classes in the design database.

2. The method of claim 1, wherein the geometric constraints include angle constraints, edge length restraints, and an interior area constraint for detecting a nub feature.

3. The method of claim 2, wherein the edge length constraints specify a maximum width for the nub feature, a maximum height for the nub feature, and a minimum base length from which the nub feature extends.

4. The method of claim 1, wherein the geometric constraints include constraints for detecting a thin line feature as having a critical dimension that is less than a predefined threshold.

5. The method of claim 1, wherein the inspection includes detection of candidate defects, wherein the feature classes are selectively detected for areas around such candidate defects, wherein defects are detected from the candidate defects based on the detected feature classes.

6. The method of claim 5, wherein the grouping and healing are selectively performed for areas around the candidate defects.

7. The method of claim 1, wherein detecting feature classes is not resolution-limited, wherein detecting the plurality of feature classes in the polygons of the design database is based on the geometric constraints being iteratively applied to each set of vertices, wherein the geometric constraints comprise rules for applying to a feature of the design database so as to determine to which geometry class such feature belongs.

8. The method of claim 1, further comprising receiving new geometric constraints that are configured by a user to be added to the geometric constraints.

9. The method of claim 1, wherein detecting defects is based on a plurality of thresholds corresponding to the feature classes detected in the design database for only features that are adjacent to such defects.

10. The method of claim 1, wherein the geometric constraints include angle constraints, edge length restraints, and an exterior area constraint for detecting a notch feature, and wherein the edge length constraints specify a maximum width for the notch feature, a maximum height for the notch feature, and a minimum base length from which the notch feature extends.

11. An inspection system for providing feature classification for inspection of a photolithographic mask, the system comprising at least one memory and at least one processor that are configured to perform the following operations:
- providing a design database for fabrication of a mask, wherein the design database has a plurality of polygons, wherein a set of vertices define each polygon;
- grouping any of the polygons that abut each other;
- healing any grouped polygons together so as to eliminate interior edges of each set of grouped polygons to obtain a polygon corresponding to a covering region of such set of grouped polygons;
- providing geometric constraints that specify requirements for detecting a plurality of feature classes, including a plurality of geometry classes, for different inspection requirements for defect detection on a mask fabricated with the design database;
- after the healing is performed on the design database, detecting a plurality of feature classes in the polygons of the design database based on the geometric constraints, wherein different feature classes are detected for different polygons meeting different geometric constraints; and
- in an inspection of a mask fabricated with the design database, detecting defects based on the detected feature classes in the design database.

12. The system of claim 11, wherein the geometric constraints include angle constraints, edge length restraints, and an interior area constraint for detecting a nub feature.

13. The system of claim 12, wherein the edge length constraints specify a maximum width for the nub feature, a maximum height for the nub feature, and a minimum base length from which the nub feature extends.

14. The system of claim 11, wherein the geometric constraints include constraints for detecting a thin line feature as having a critical dimension that is less than a predefined threshold.

15. The system of claim 11, wherein the inspection includes detection of candidate defects, wherein the feature classes are selectively detected for areas around such candidate defects, wherein defects are detected from the candidate defects based on the detected feature classes.

16. The system of claim 15, wherein the grouping and healing are selectively performed for areas around the candidate defects.

17. The system of claim 11, wherein detecting feature classes is not resolution-limited, wherein detecting the plurality of feature classes in the polygons of the design database is based on the geometric constraints being iteratively applied to each set of vertices, wherein the geometric constraints comprise rules for applying to a feature of the design database so as to determine to which geometry class such feature belongs.

18. The system of claim 11, wherein the at least one memory and at least one processor are further configured for receiving new geometric constraints that are configured by a user to be added to the geometric constraints.

19. The system of claim 11, wherein detecting defects is based on a plurality of thresholds corresponding to the feature classes detected in the design database.

20. The system of claim 11, wherein the geometric constraints include angle constraints, edge length restraints, and an exterior area constraint for detecting a notch feature, and wherein the edge length constraints specify a maximum width for the notch feature, a maximum height for the notch feature, and a minimum base length from which the notch feature extends.

* * * * *